United States Patent
Chen et al.

(10) Patent No.: US 11,474,856 B2
(45) Date of Patent: Oct. 18, 2022

(54) METHOD AND APPARATUS FOR GENERATING INFORMATION

(71) Applicant: BEIJING BAIDU NETCOM SCIENCE AND TECHNOLOGY CO., LTD., Beijing (CN)

(72) Inventors: Xiaoxu Chen, Beijing (CN); Zhiyuan Zhang, Beijing (CN); Feng Liu, Beijing (CN); Tao Yang, Beijing (CN); Xiang Gao, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 141 days.

(21) Appl. No.: 17/030,162

(22) Filed: Sep. 23, 2020

(65) Prior Publication Data
US 2021/0224103 A1 Jul. 22, 2021

(30) Foreign Application Priority Data
Jan. 20, 2020 (CN) .......................... 202010067282.2

(51) Int. Cl.
*G06F 9/46* (2006.01)
*G06F 9/48* (2006.01)
*G06F 9/50* (2006.01)

(52) U.S. Cl.
CPC ............ *G06F 9/485* (2013.01); *G06F 9/4881* (2013.01); *G06F 9/5038* (2013.01)

(58) Field of Classification Search
CPC ....... G06F 9/485; G06F 9/4881; G06F 9/5038
See application file for complete search history.

(56) References Cited

U.S. PATENT DOCUMENTS 9,183,092 B1* 11/2015 Marr .................. G06F 11/1417
2004/0177139 A1* 9/2004 Schuba ............... H04L 63/0263
709/223

(Continued)

FOREIGN PATENT DOCUMENTS

JP H0588869 4/1993
JP H06151282 5/1994

(Continued)

OTHER PUBLICATIONS

Huimin Ge, Hui Sun, and Ying Lu; Research on Characteristics and Trends of Traffic Flow Based on Mixed Velocity Method and Background Difference Method; Revised Jul. 5, 2020; Accepted Jul. 21, 2020; Published Aug. 28, 2020.*

(Continued)

*Primary Examiner* — Camquy Truong
(74) *Attorney, Agent, or Firm* — Knobbe, Martens, Olson & Bear, LLP (57) ABSTRACT

Embodiments of the present disclosure relate to a method and apparatus for generating information. The method may include: acquiring at least one to-be-processed service and at least one piece of relationship information, the relationship information being used to represent an execution order between two to-be-processed services in the at least one to-be-processed service; constructing a directed graph with a to-be-processed service in the at least one to-be-processed service as a point and with a piece of relationship information in the at least one piece of relationship information as a directed edge; and generating execution order information of the to-be-processed service in the at least one to-be-processed service according to the directed graph.

11 Claims, 6 Drawing Sheets

(56) References Cited

U.S. PATENT DOCUMENTS

| | | | |
|---|---|---|---|
| 2006/0218525 A1* | 9/2006 | Yamashita | G06F 9/5038 |
| | | | 717/109 |
| 2011/0276976 A1 | 11/2011 | Tsudaka et al. | |
| 2017/0052695 A1* | 2/2017 | Lee | G11B 27/102 |
| 2018/0276040 A1 | 9/2018 | Hosmani et al. | |

FOREIGN PATENT DOCUMENTS

| | | |
|---|---|---|
| WO | WO 2010113242 | 10/2010 |
| WO | WO 2012101893 | 8/2012 |

OTHER PUBLICATIONS

Cormen, et al., "Introduction to Algorithms, third edition", The MIT Press, Cambridge, Massachusetts. 44 pages.
Topological Sorting, Wikipedia, Feb. 25, 2021.

* cited by examiner

METHOD AND APPARATUS FOR GENERATING INFORMATION

CROSS-REFERENCE TO RELATED APPLICATIONS

This application claims priority to Chinese Application No. 202010067282.2, filed on Jan. 20, 2020 and entitled "Method and Apparatus for Generating Information," the entire disclosure of which is hereby incorporated by reference.

TECHNICAL FIELD

Embodiments of the present disclosure relate to the field of data processing technology, and specifically to a method and apparatus for generating information.

BACKGROUND

The microservice architecture style is a way to develop a single application using a set of microservices. Each service runs in its own process and communicates using a lightweight mechanism. Massive specific services (i.e., data processing tasks) exist in the microservices, and the execution order of these services may be serial execution or parallel execution. When specifically executed, the execution order of the services needs to be determined according to the serial execution relationship or the parallel execution relationship between the services.

SUMMARY

Embodiments of the present disclosure propose a method and apparatus for generating information.

In a first aspect, an embodiment of the present disclosure provides a method for generating information, the method including: acquiring at least one to-be-processed service and at least one piece of relationship information, the relationship information being used to represent an execution order between two to-be-processed services in the at least one to-be-processed service; constructing a directed graph with a to-be-processed service in the at least one to-be-processed service as a point and with a piece of relationship information in the at least one piece of relationship information as a directed edge; and generating execution order information of the to-be-processed service in the at least one to-be-processed service according to the directed graph.

In some embodiments, the constructing a directed graph with a to-be-processed service in the at least one to-be-processed service as a point and with a piece of relationship information in the at least one piece of relationship information as a directed edge includes: setting a corresponding service number for the to-be-processed service in the at least one to-be-processed service, to obtain at least one service number corresponding to the at least one to-be-processed service; and marking the at least one service number in a planar graph, and setting at least one directed edge for a corresponding service number according to the piece of relationship information in the at least one piece of relationship information to obtain the directed graph, where a to-be-processed service corresponding to a starting point of the directed edge is executed prior to a to-be-processed service corresponding to an end point of the directed edge.

In some embodiments, the constructing a directed graph with a to-be-processed service in the at least one to-be-processed service as a point and with a piece of relationship information in the at least one piece of relationship information as a directed edge includes: detecting the directed graph, and giving a warning signal in response to determining an information loop.

In some embodiments, the generating execution order information of the to-be-processed service in the at least one to-be-processed service according to the directed graph includes: determining an execution starting point, an execution end point and at least one execution midpoint in the directed graph, the execution starting point being used to represent a to-be-processed service to be first executed, the execution end point being used to represent a to-be-processed service to be finally executed, and the execution midpoint being used to represent a to-be-processed service to be executed from the execution starting point to the execution end point; setting respectively first execution order information and final execution order information for the execution starting point and the execution end point; and for an execution midpoint in the at least one execution midpoint, determining execution order information between the execution midpoint and another execution midpoint according to the first execution order information, the final execution order information and a directed edge.

In some embodiments, the determining execution order information between the execution midpoint and another execution midpoint according to the first execution order information, the final execution order information and a directed edge includes: querying a number of accesses to an end point of a directed edge of the execution midpoint, and determining the execution order information between the execution midpoint and the other execution midpoint according to the number of the accesses.

In some embodiments, the determining the execution order information between the execution midpoint and the other execution midpoint according to the number of the accesses includes: querying at least one upper-level service number of a to-be-processed service corresponding to a starting point of the directed edge corresponding to the number of the accesses; querying a finally executed upper-level service number in the at least one upper-level service number according to the first execution order information and the final execution order information; and setting the execution order information of the execution midpoint to next execution order information of execution order information of the finally executed upper-level service number.

In some embodiments, the method further includes: executing the at least one to-be-processed service according to the execution order information.

In a second aspect, an embodiment of the present disclosure provides an apparatus for generating information, the apparatus including: an information acquiring unit, configured to acquire at least one to-be-processed service and at least one piece of relationship information, the relationship information being used to represent an execution order between two to-be-processed services in the at least one to-be-processed service; a directed graph constructing unit, configured to construct a directed graph with a to-be-processed service in the at least one to-be-processed service as a point and with a piece of relationship information in the at least one piece of relationship information as a directed edge; and an information generating unit, configured to generate execution order information of the to-be-processed service in the at least one to-be-processed service according to the directed graph.

In some embodiments, the directed graph constructing unit includes: a service number setting subunit, configured to set a corresponding service number for the to-be-processed service in the at least one to-be-processed service, to obtain at least one service number corresponding to the at least one to-be-processed service; and a directed graph constructing subunit, configured to mark the at least one service number in a planar graph, and set at least one directed edge for a corresponding service number according to the piece of relationship information in the at least one piece of relationship information to obtain the directed graph, wherein a to-be-processed service corresponding to a starting point of the directed edge is executed prior to a to-be-processed service corresponding to an end point of the directed edge.

In some embodiments, the directed graph constructing unit includes: a warning subunit, configured to detect the directed graph, and give a warning signal in response to determining an information loop exist.

In some embodiments, the information generating unit includes: a point relationship determining subunit, configured to determine an execution starting point, an execution endpoint and at least one execution midpoint in the directed graph, the execution starting point being used to represent a to-be-processed service to be first executed, the execution end point being used to represent a to-be-processed service to be finally executed, and the execution midpoint being used to represent a to-be-processed service to be executed from the execution starting point to the execution end point; a first execution order information setting subunit, configured to set respectively first execution order information and final execution order information for the execution starting point and the execution end point; and a second execution order information setting subunit, configured to, for an execution midpoint in the at least one execution midpoint, determine execution order information between the execution midpoint and another execution midpoint according to the first execution order information, the final execution order information and a directed edge.

In some embodiments, the second execution order information setting subunit includes: an execution order information determining module, configured to query a number of accesses to an end point of a directed edge of the execution midpoint, and determine the execution order information between the execution midpoint and the other execution midpoint according to the number of the accesses.

In some embodiments, the execution order information determining module includes: an upper-level service number querying submodule, configured to query at least one upper-level service number of a to-be-processed service corresponding to a starting point of the directed edge corresponding to the number of the accesses; an upper-level service number determining submodule, configured to query a finally executed upper-level service number in the at least one upper-level service number according to the first execution order information and the final execution order information; and an execution order information determining submodule, configured to set the execution order information of the execution midpoint to next execution order information of execution order information of the finally executed upper-level service number.

In some embodiments, the apparatus further includes: an executing unit, configured to execute the at least one to-be-processed service according to the execution order information.

In a third aspect, an embodiment of the present disclosure provides an electronic device, the device electronic including: one or more processors; and a storage device, for storing one or more programs, where the one or more programs, when executed by the one or more processors, cause the one or more processors to implement the method for generating information according to the first aspect.

In a fourth aspect, an embodiment of the present disclosure provides a computer readable medium, storing a computer program thereon, where the computer program, when executed by a processor, implements the method for generating information according to the first aspect.

According to the method and apparatus for generating information provided in embodiments of the present disclosure, the at least one to-be-processed service and the at least one piece of relationship information are first acquired. Then, the directed graph is constructed with the to-be-processed service in the at least one to-be-processed service as the point and with the piece of relationship information in the at least one piece of relationship information as the directed edge. Finally, the execution order information of the to-be-processed service in the at least one to-be-processed service is generated according to the directed graph. According to some embodiments of the present disclosure, the execution order information of a plurality of to-be-processed services having a serial execution relationship and a parallel execution relationship at the same time may be determined.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
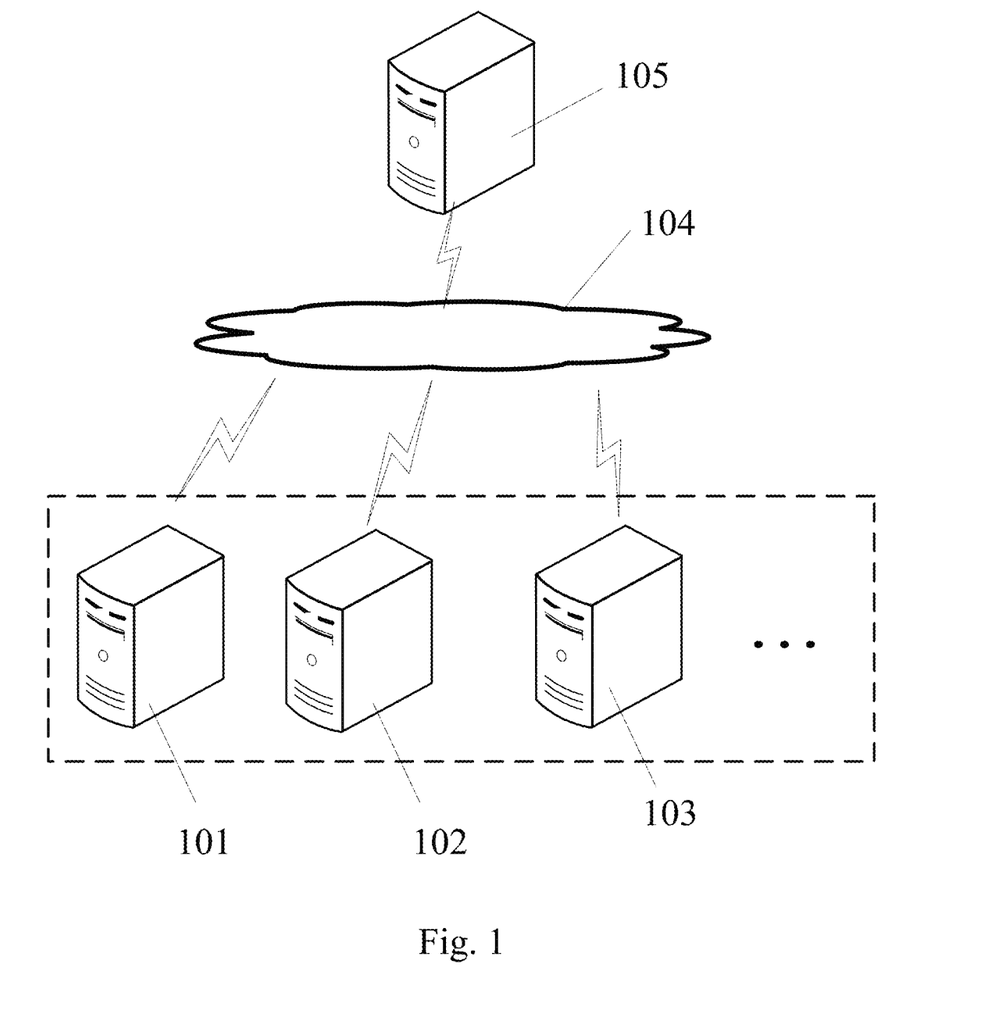
FIG. 1 is a diagram of an example system architecture in which an embodiment of the present disclosure may be applied.

FIG. 1 illustrates an example system architecture 100 in which a method for generating information or an apparatus for generating information according to embodiments of the present disclosure may be applied.

As shown in FIG. 1, the system architecture 100 may include service devices 101, 102 and 103, a network 104 and a control device 105. The network 104 serves as a medium providing a communication link between the service devices 101, 102 and 103 and the control device 105. The network 104 may include various types of connections, for example, wired or wireless communication links, or optical fiber cables.

The service devices 101, 102 and 103 interact with the control device 105 via the network 104, to receive or send a message, etc. Various data processing applications (e.g., a webpage browser application, a shopping application, a search application, an instant communication tool, a mailbox client and social platform software) may be installed on the service devices 101, 102 and 103.

The service devices 101, 102 and 103 may be hardware or software. When being the hardware, the service devices 101, 102 and 103 may be various electronic devices supporting data processing, the electronic devices including, but not limited to, a smart phone, a tablet computer, a laptop portable computer, a desktop computer, etc. When being the software, the service devices 101, 102 and 103 may be installed in the above listed electronic devices. The service devices may be implemented as a plurality of pieces of software or a plurality of software modules (e.g., software or software modules for providing a distributed service), or may be implemented as a single piece of software or a single software module, which will not be specifically defined here.

The control device 105 may be a server providing various services, for example, a server setting an execution order of various services on the service devices 101, 102 and 103. The server may process (e.g., analyze) received data (e.g., to-be-processed services and relationship information) corresponding to the service devices 101, 102 and 103, and feed back the processing result (e.g., execution order information) to the service devices 101, 102 and 103.

It should be noted that the method for generating information provided in embodiments of the present disclosure is generally performed by the control device 105. Correspondingly, the apparatus for generating information is generally provided in the control device 105.

It should be noted that the control device 105 may be hardware or software. When being the hardware, the control device 105 may be implemented as a distributed server cluster composed of a plurality of control devices, or may be implemented as a single server. When being the software, the control device 105 may be implemented as a plurality of pieces of software or a plurality of software modules (e.g., software or software modules for providing a distributed service), or may be implemented as a single piece of software or a single software module, which will not be specifically defined here.

It should be appreciated that the numbers of the service devices, the networks and the control devices in FIG. 1 are merely illustrative. Any number of service devices, networks and control devices may be provided based on actual requirements.

Figure 2:
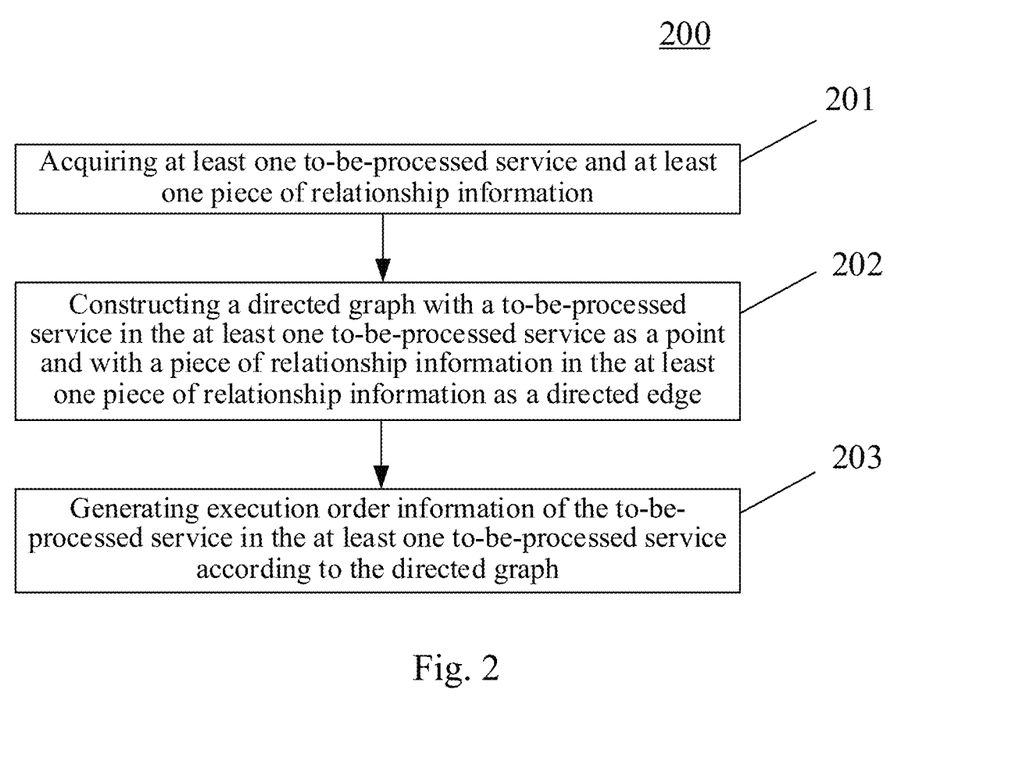
FIG. 2 is a flowchart of a method for generating information according to an embodiment of the present disclosure.

Further referring to FIG. 2, FIG. 2 illustrates a flow 200 of a method for generating information according to an embodiment of the present disclosure. The method for generating information includes the following steps.

Step 201, acquiring at least one to-be-processed service and at least one piece of relationship information.

In this embodiment, an executing body (e.g., the control device 105 shown in FIG. 1) of the method for generating information may acquire, by means of a wired connection or a wireless connection, the at least one to-be-processed service and the at least one piece of relationship information. It should be noted that the wireless connection may include, but not limited to, a 3G/4G connection, a WiFi connection, a Bluetooth connection, a WiMAX connection, a Zigbee connection, a UWB (ultra wideband) connection, and other wireless connections now known or developed in the future.

Under a microservice architecture, an execution order between service devices may be serial execution or parallel execution. In the existing technology, when the execution order between the service devices is the serial execution, a technician is generally required to deploy the service devices according to the execution order. Accordingly, the serial execution consumes more time and is not applicable to a large scale of service devices. When the execution order between the service devices is the parallel execution, it is only applicable to service devices only executed in parallel, and not applicable to a situation where the parallel execution and the serial execution exist at the same time. Therefore, the range of application of the existing parallel execution is small.

In order to determine the execution order between the service devices 101, 102 and 103, the executing body needs to first acquire the at least one to-be-processed service and the at least one piece of relationship information that correspond to the service devices 101, 102 and 103. Here, the to-be-processed service may be a data processing service of the service devices 101, 102 or 103. For example, if the service device 101 is a webpage server, the corresponding to-be-processed service may be a webpage information query service. The relationship information may be used to represent an execution order between two to-be-processed services in the at least one to-be-processed service. That is, the relationship information may also be considered as a dependency relationship between the to-be-processed services.

Step 202, constructing a directed graph with a to-be-processed service in the at least one to-be-processed service as a point and with a piece of relationship information in the at least one piece of relationship information as a directed edge.

After obtaining the at least one to-be-processed service and the at least one piece of relationship information, the executing body may construct the directed graph according to the at least one to-be-processed service and the at least one piece of relationship information. Here, a point of the directed graph may be used to represent a to-be-processed service. A directed edge of the directed graph may be used to represent a piece of relationship information.

In some alternative implementations of this embodiment, the constructing a directed graph with a to-be-processed service in the at least one to-be-processed service as a point and with a piece of relationship information in the at least one piece of relationship information as a directed edge may include the following steps.

In a first step, a corresponding service number is set for the to-be-processed service in the at least one to-be-processed service, to obtain at least one service number corresponding to the at least one to-be-processed service.

In order to obtain the directed graph, the executing body may first set a corresponding service number for each to-be-processed service in the at least one to-be-processed service, to obtain at least one service number corresponding to the at least one to-be-processed service.

In a second step, the at least one service number is marked in a planar graph, and at least one directed edge is set for a corresponding service number according to the piece of relationship information in the at least one piece of relationship information, to obtain the directed graph.

The executing body may mark the at least one service number in the planar graph. In order to facilitate adding a directed edge between service numbers, the executing body, when marking, may mark each service number in the planar graph randomly or otherwise. Thereafter, the executing body may set the directed edge according to the relationship information, to obtain the directed graph. Thus, a dependency relationship between points in the directed graph is established through the directed edge. Here, a to-be-processed service corresponding to the starting point of the directed edge is executed prior to a to-be-processed service corresponding to the end point of the directed edge.

In some alternative implementations of this embodiment, the constructing a directed graph with a to-be-processed service in the at least one to-be-processed service as a point and with a piece of relationship information in the at least one piece of relationship information as a directed edge may include: detecting the directed graph, and giving a warning signal if an information loop exists.

Normally, there is no loop between points in the constructed directed graph. That is, there is no "loop" in the directed digraph. If there is a "loop," information processing is caused to fall into an infinite loop. For example, if a first point points to a second point through a directed edge, the second point points to a third point through a directed edge, and the third point points to the first point through a directed edge, a loop is formed among the first point, the second point and the third point. In practice, for some reason, there may be a loop in the directed graph constructed by the executing body. At this time, the executing body may give the warning signal to cause the technician to query and adjust the relationship information. The executing body may also determine whether a loop exists through a method such as a loop detection algorithm of the directed digraph, which will not be repeatedly described here.

Step 203, generating execution order information of the to-be-processed service in the at least one to-be-processed service according to the directed graph.

The point and the directed edge in the directed graph may represent the to-be-processed service and the relationship information. According to the directed edge, the flow direction between points (i.e., the sequence of the points) in the directed graph may be determined, and then the execution order information of the to-be-processed service is obtained. Here, the execution order information may be represented by an execution order number, or may be represented by other types of information, which will not be repeatedly described here.

In some alternative implementations of this embodiment, the generating execution order information of the to-be-processed service in the at least one to-be-processed service according to the directed graph may include the following steps.

In a first step, an execution starting point, an execution end point and at least one execution midpoint in the directed graph are determined.

In order to acquire the execution order information, the executing body may first determine the execution starting point and the execution end point in the directed graph. Here, the execution starting point may be used to represent a to-be-processed service that is first executed. For example, when a certain point in the directed graph is only used as the starting point of a directed edge, it may be considered that the point is the execution starting point. The execution end point may be used to represent a to-be-processed service that is finally executed. For example, when a certain point in the directed graph is only used as an end point of a directed edge, it may be considered that the point is the execution end point. After the execution starting point and the execution end point are determined, a remaining point is an execution midpoint. Here, the execution midpoint may be used to represent a to-be-processed service that is to be executed from the execution starting point to the execution end point. For example, a certain point in the directed graph may be considered as an execution midpoint when the point may be used as a starting point of a directed edge and also may be used as an end point of a directed edge.

In practice, one directed graph may have a plurality of execution starting points and/or a plurality of execution end points, depending on actual needs. Since the number of execution midpoints in the directed graph is generally more than one, the execution starting point and the execution end point may be determined first, and then the execution midpoints are determined.

In a second step, first execution order information and final execution order information are respectively set for the execution starting point and the execution end point.

After determining the execution starting point and the execution end point, first, the executing body may set the first execution order information and the final execution order information for the execution starting point and the execution end point respectively. Here, the first execution order information may be used to represent that the corresponding to-be-processed service is first executed. The final execution order information may be used to represent that the corresponding to-be-processed service is finally executed. The first execution order information and the final execution order information may be represented by a digit, a letter, other numbers, or the like.

In a third step, for an execution midpoint in the at least one execution midpoint, execution order information between the execution midpoint and another execution midpoint is determined according to the first execution order information, the final execution order information and the directed edge.

The execution order of the execution midpoint is between the execution starting point and the execution end point. After determining the first execution order information corresponding to the execution starting point and the final execution order information corresponding to the execution end point, the executing body may determine the execution order information between execution midpoints based on the first execution order information and the final execution order information. For example, the executing body may determine the execution order between two execution midpoints, and further determine the execution order information of all the execution midpoints.

In addition, the executing body may determine only the execution starting point in the directed digraph. All remaining points are used as execution midpoints. Then, the relationship between each execution midpoint and the execution starting point is queried, and the execution midpoint of a second execution order is first determined. Then, the execution midpoint of a third execution order is determined, until the execution order of a final execution midpoint is determined.

In some alternative implementations of this embodiment, determining the execution order information between the execution midpoint and the other execution midpoint according to the first execution order information, the final execution order information and the directed edge may include: querying a number of accesses to an end point of a directed edge of the execution midpoint, and determining the execution order information between the execution midpoint and the other execution midpoint according to the number of the accesses.

The executing body may query the number of the accesses to the endpoint of the directed edge of the execution midpoint. If the number of the accesses is one, it indicates that the current execution midpoint is set to the next execution order of the execution order of a previous execution midpoint. If the number of the accesses is more than one, it indicates that the current execution midpoint needs to be able to be executed only after the execution for a plurality of other execution midpoints is completed. At this time, the executing body needs to determine the execution order between the current execution midpoint and the other execution midpoints, and thus can determine the execution order information of the current execution midpoint.

In some alternative implementations of this embodiment, the determining the execution order information between the execution midpoint and the other execution midpoint according to the number of the accesses may include the following steps.

In a first step, at least one upper-level service number of a to-be-processed service corresponding to a starting point of the directed edge corresponding to the number of the accesses is queried.

The executing body may query the at least one upper-level service number of the to-be-processed service corresponding to the starting point of the directed edge corresponding to the number of the accesses according to the directed edge.

In a second step, a finally executed upper-level service number in the at least one upper-level service number is queried according to the first execution order information and the final execution order information.

When an upper-level service number corresponds to the execution starting point, it indicates that the current execution midpoint may be the second execution order, or another execution order. At this time, when there is a serial execution relationship between the current execution midpoint and the execution starting point, and when the upper-level service number does not correspond to the execution starting point, it indicates that the upper-level service number is another execution midpoint. At this time, the executing body may re-query a new upper-level service number with the midpoint corresponding to the current upper-level service number as a starting point. In this way, the execution midpoint of the second execution order, the execution midpoint of the third execution order, and the like may be progressively determined layer by layer, and thus, service numbers corresponding to the execution midpoints are determined.

In a third step, the execution order information of the execution midpoint is set to next execution order information of execution order information of the finally executed upper-level service number.

When a certain execution midpoint has a plurality of upper-level service numbers, the executing body may query the finally executed upper-level service number among the upper-level service numbers. For example, the current execution midpoint has two upper-level service numbers, the execution order information of one upper-level service number is 2, and the execution order information of the other upper-level service number is 3. The executing body may set the execution order information of the current execution midpoint to the execution order information 4. That is, the to-be-processed service corresponding to the current execution midpoint needs to be able to be executed only after the execution for the two to-be-processed services with the execution order information of 2 and 3 is completed. When there is another execution midpoint which also needs to be able to be executed only after the execution for the two to-be-processed services with the execution order information of 2 and 3 is completed, it indicates that the current execution midpoint and the other execution midpoint may be executed in parallel.

In this way, the execution orders of a plurality of to-be-processed services having a serial execution relationship and a parallel execution relationship may be determined.

Further, the executing body may also modify the execution order information of the execution end point according to the execution order of the final execution midpoint. For example, when the execution order of the final execution midpoint is sixth, the execution order information of the execution end point may be modified to seventh. The executing body may also determine the execution order information of each point in the directed graph through a method such as a label-based topology sorting algorithm, which will not be repeatedly described here.

Figure 3:
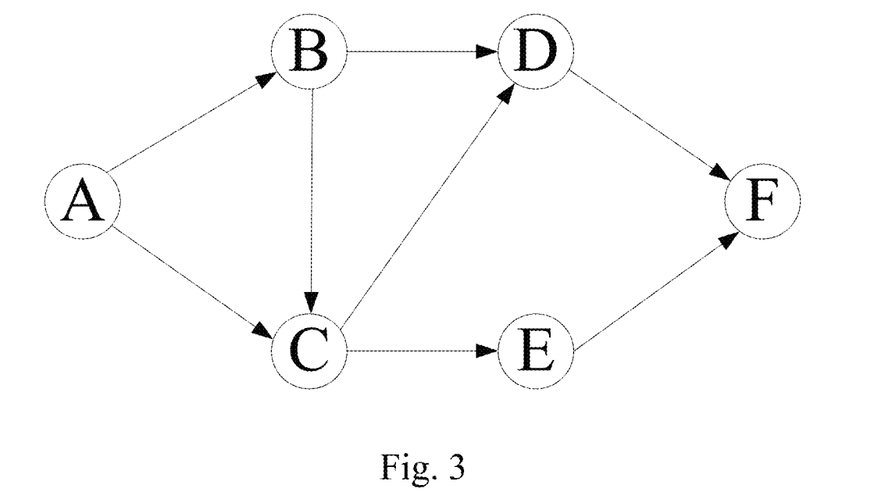
FIG. 3 is a schematic diagram of an application scenario of the method for generating information according to the present disclosure.

Further referring to FIG. 3, FIG. 3 is a schematic diagram of an application scenario of the method for generating information according to this embodiment. In the application scenario of FIG. 3, the to-be-processed services of a service device that are acquired by the control device 105 may be: {A, B, C, D, E, F}; and the relationship information may be: {(A, B), (A, C), (B, C), (B, D), (C, E), (C, D), (D, F), (E, F)}. Then, the control device 105 constructs a directed graph with the to-be-processed services as points and with the relationship information as directed edges, as shown in FIG. 3. As may be seen from FIG. 3, the to-be-processed service A is first executed, and then directed edges corresponding to the to-be-processed service A point to the to-be-processed service B and the to-be-processed service C. Here, the to-be-processed service B has only one directed edge from the to-be-processed service A, but the to-be-processed service C has directed edges respectively from the to-be-processed service A and the to-be-processed service B. Therefore, the execution order of the to-be-processed service B is second (serial execution). The to-be-processed service C needs to be able to be executed only after the execution for the to-be-processed service A and the to-be-processed service B is completed. Thus, the execution order of the to-be-processed service C is third (serial execution). The to-be-processed service D needs to be able to be executed only after the execution for the to-be-processed service B and the to-be-processed service C is completed, and the to-be-processed service E can be executed only after the execution for the to-be-processed service C is completed. Since the to-be-processed service C is executed only after the execution for the to-be-processed service B is completed, both the to-be-processed service D and the to-be-processed service E may be considered to be executed only after the execution for the to-be-processed service C is completed. Therefore, the to-be-processed service D and the to-be-processed service E may be executed simultaneously (parallel execution). The to-be-processed service F needs to be able to be executed only after the execution for the to-be-processed service D and the to-be-processed service E is completed (serial execution). Finally, the execution order information of the to-be-processed services that is generated by the control device 105 according to the directed graph in FIG. 3 may be: $\{A^1, B^2, C^3, D^4, E^4, F^5\}$. Here, the upper right corner mark is the execution order information.

According to the method provided in the above embodiment of the present disclosure, the at least one to-beprocessed service and the at least one piece of relationship information are first acquired. Then, the directed graph is constructed with the to-be-processed service in the at least one to-be-processed service as the point and with the piece of relationship information in the at least one piece of relationship information as the directed edge. Finally, the execution order information of the to-be-processed service in the at least one to-be-processed service is generated according to the directed graph. According to some embodiments of the present disclosure, the execution order information of a plurality of to-be-processed services having a serial execution relationship and a parallel execution relationship at the same time may be determined.

Figure 4:
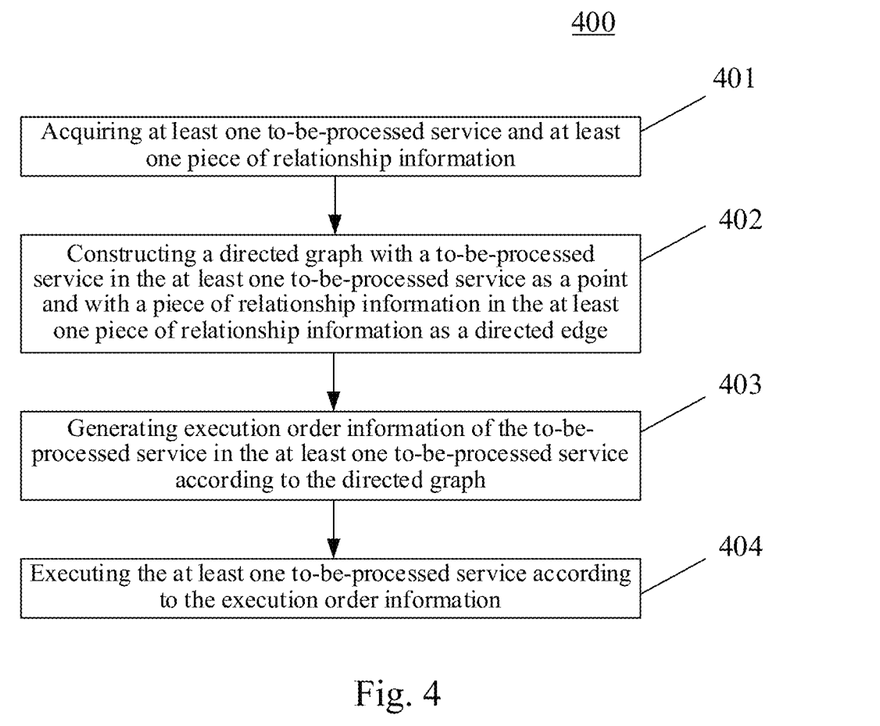
FIG. 4 is a flowchart of the method for generating information according to another embodiment of the present disclosure.

Further referring to FIG. 4, FIG. 4 illustrates a flow 400 of another embodiment of the method for generating information. The flow 400 of the method for generating information includes the following steps.

Step 401, acquiring at least one to-be-processed service and at least one piece of relationship information.

In this embodiment, an executing body (e.g., the control device 105 shown in FIG. 1) of the method for generating information may acquire, by means of a wired connection or a wireless connection, the at least one to-be-processed service and the at least one piece of relationship information.

The content of step 401 is the same as that of step 201, which will not be repeatedly described here.

Step 402, constructing a directed graph with a to-be-processed service in the at least one to-be-processed service as a point and with a piece of relationship information in the at least one piece of relationship information as a directed edge.

The content of step 402 is the same as that of step 202, which will not be repeatedly described here.

Step 403, generating execution order information of the to-be-processed service in the at least one to-be-processed service according to the directed graph.

The content of step 403 is the same as that of step 203, which will not be repeatedly described here.

Step 404, executing the at least one to-be-processed service according to the execution order information.

After acquiring the execution order information, the executing body may execute the to-be-processed service in sequence according to the execution order information, thereby implementing the execution for to-be-processed services having a serial execution relationship and a parallel execution relationship.

Figure 5:
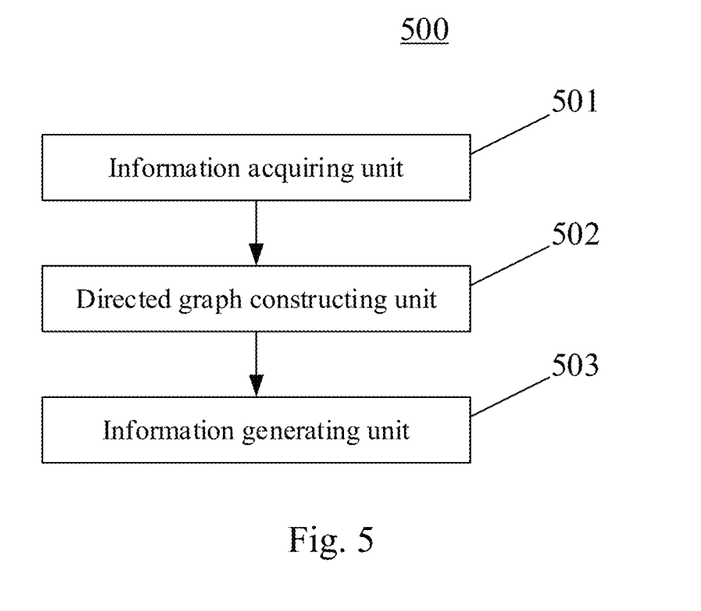
FIG. 5 is a schematic structural diagram of an apparatus for generating information according to an embodiment of the present disclosure.

Further referring to FIG. 5, as an implementation of the method shown in the above drawings, an embodiment of the present disclosure provides an apparatus for generating information. The embodiment of the apparatus may correspond to the embodiment of the method shown in FIG. 2, and the apparatus may be applied in various electronic devices.

As shown in FIG. 5, the apparatus 500 for generating information in this embodiment may include: an information acquiring unit 501, a directed graph constructing unit 502 and an information generating unit 503. Here, the information acquiring unit 501 is configured to acquire at least one to-be-processed service and at least one piece of relationship information, the relationship information being used to represent an execution order between two to-be-processed services in the at least one to-be-processed service. The directed graph constructing unit 502 is configured to construct a directed graph with a to-be-processed service in the at least one to-be-processed service as a point and with a piece of relationship information in the at least one piece of relationship information as a directed edge. The information generating unit 503 is configured to generate execution order information of the to-be-processed service in the at least one to-be-processed service according to the directed graph.

In some alternative implementations of this embodiment, the directed graph constructing unit 502 may include: a service number setting subunit (now shown) and a directed graph constructing subunit (now shown). The service number setting subunit is configured to set a corresponding service number for the to-be-processed service in the at least one to-be-processed service, to obtain at least one service number corresponding to the at least one to-be-processed service. The directed graph constructing subunit is configured to mark the at least one service number in a planar graph, and set at least one directed edge for a corresponding service number according to the piece of relationship information in the at least one piece of relationship information to obtain the directed graph, where a to-be-processed service corresponding to a starting point of the directed edge is executed prior to a to-be-processed service corresponding to an end point of the directed edge.

In some alternative implementations of this embodiment, the directed graph constructing unit 502 may include: a warning subunit (not shown), configured to detect the directed graph, and give a warning signal in response to determining an information loop.

In some alternative implementations of this embodiment, the information generating unit 503 may include: a point relationship determining subunit (not shown), a first execution order information setting subunit (not shown) and a second execution order information setting subunit (not shown). Here, the point relationship determining subunit is configured to determine an execution starting point, an execution end point and at least one execution midpoint in the directed graph, the execution starting point being used to represent a to-be-processed service to be first executed, the execution end point being used to represent a to-be-processed service to be finally executed, and the execution midpoint being used to represent a to-be-processed service to be executed from the execution starting point to the execution end point. The first execution order information setting subunit is configured to set respectively first execution order information and final execution order information for the execution starting point and the execution end point. The second execution order information setting subunit is configured to, for an execution midpoint in the at least one execution midpoint, determine execution order information between the execution midpoint and another execution midpoint according to the first execution order information, the final execution order information and a directed edge.

In some alternative implementations of this embodiment, the second execution order information setting subunit may include: an execution order information determining module (not shown), configured to query a number of accesses to an end point of a directed edge of the execution midpoint, and determine the execution order information between the execution midpoint and the other execution midpoint according to the number of the accesses.

In some alternative implementations of this embodiment, the execution order information determining module includes: an upper-level service number querying submodule (not shown), an upper-level service number determining submodule (not shown) and an execution order information determining submodule (not shown). Here, the upper-level service number querying submodule is configured to query at least one upper-level service number of a to-be-processed service corresponding to a starting point of the directed edge corresponding to the number of the accesses. The upper-level service number determining submodule is configured to query a finally executed upper-level service number in the at least one upper-level service number according to the first execution order information and the final execution order information. The execution order information determining submodule is configured to set the execution order information of the execution midpoint to next execution order information of execution order information of the finally executed upper-level service number.

In some alternative implementations of this embodiment, the apparatus 500 for generating information may further include: an executing unit (not shown), configured to execute the at least one to-be-processed service according to the execution order information.

This embodiment further provides an electronic device, the electronic device including one or more processors and a storage device for storing one or more programs. The one or more programs, when executed by the one or more processors, cause the one or more processors to perform the method for generating information.

This embodiment further provides a computer readable medium storing a computer program. The program, when executed by a processor, implements the method for generating information.

Figure 6:
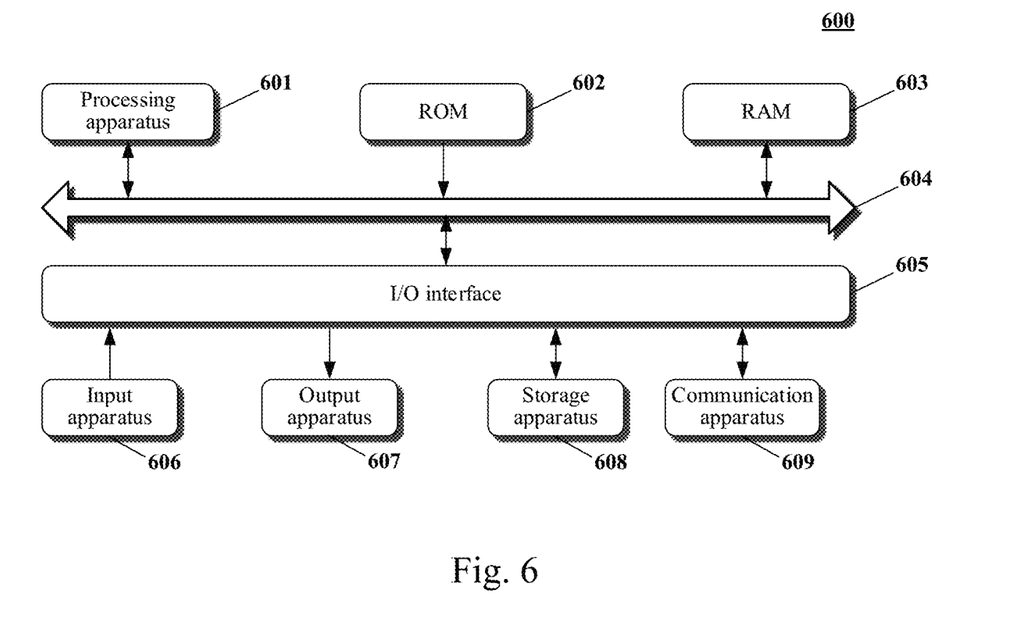
FIG. 6 is a schematic structural diagram of an electronic device adapted to implement embodiments of the present disclosure.

Referring to FIG. 6, FIG. 6 is a schematic structural diagram of a computer system 600 of an electronic device (e.g., the control device 105 in FIG. 1) adapted to implement embodiments of the present disclosure. The electronic device shown in FIG. 6 is merely an example, and should not bring any limitations to the functions and the scope of use of embodiments of the present disclosure.

As shown in FIG. 6, the electronic device 600 may include a processing apparatus (e.g., a central processing unit and a graphics processing unit) 601, which may execute various appropriate actions and processes in accordance with a program stored in a read-only memory (ROM) 602 or a program loaded into a random access memory (RAM) 603 from a storage apparatus 608. The RAM 603 also stores various programs and data required by operations of the electronic device 600. The processing apparatus 601, the ROM 602 and the RAM 603 are connected to each other through a bus 604. An input/output (I/O) interface 605 is also connected to the bus 604.

Generally, the following apparatuses may be connected to the I/O interface 605: an input apparatus 606 including, for example, a touch screen, a touch pad, a keyboard, a mouse, a camera, a microphone, an accelerometer and a gyroscope; an output apparatus 607 including, for example, a liquid crystal display (LCD), a speaker and a vibrator; the storage apparatus 608 including, for example, a magnetic tape and a hard disk; and a communication apparatus 609. The communication apparatus 609 may allow the electronic device 600 to exchange data with other devices by means of a wireless communication or a wired communication. Although FIG. 6 illustrates the electronic device 600 having various apparatuses, it should be understood that it is not required to implement or possess all of the shown apparatuses. More or fewer apparatuses may alternatively be implemented or possessed. Each block shown in FIG. 6 may represent one apparatus, or may represent a plurality of apparatuses as needed.

In particular, according to embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication apparatus 609, may be installed from the storage apparatus 608, or may be installed from the ROM 602. The computer program, when executed by the processing apparatus 601, implements the above functionalities defined in the method of embodiments of the present disclosure.

It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. Amore specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as apart of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be a computer readable medium included in the above electronic device, or a stand-alone computer readable medium not assembled into the electronic device. The above computer readable medium carries one or more programs. The one or more programs, when executed by the electronic device, cause the electronic device to: acquire at least one to-be-processed service and at least one piece of relationship information, the relationship information being used to represent an execution order between two to-be-processed services in the at least one to-be-processed service; construct a directed graph with a to-be-processed service in the at least one to-be-processed service as a point and with a piece of relationship information in the at least one piece of relationship information as a directed edge; and generate execution order information of the to-be-processed service in the at least one to-be-processed service according to the directed graph.

A computer program code for executing operations in some embodiments of the present disclosure may be compiled using one or more programming languages or combinations thereof. The programming languages include objectoriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware. The described units may also be provided in a processor. For example, the processor may be described as: a processor including an information acquiring unit, a directed graph constructing unit and an information generating unit. Here, the names of these units do not in some cases constitute a limitation to such units themselves. For example, the information generating unit may also be described as "a unit for generating execution order information of a point in a directed graph."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A computer-implemented method for generating information, comprising:
    acquiring a plurality of to-be-processed services and at least one piece of relationship information, the relationship information being used to represent an execution order between each of a plurality of pairs of to-be-processed services in the plurality of to-be-processed services;
    constructing a directed graph with a to-be-processed service in the plurality of to-be-processed services as a point and with a piece of relationship information in the at least one piece of relationship information as a directed edge; and
    generating execution order information of the to-be-processed service in the plurality of to-be-processed services according to the directed graph, wherein the generating execution order information of the to-be-processed service in the plurality of to-be-processed service according to the directed graph comprises:
        determining an execution starting point, an execution end point and at least one execution midpoint in the directed graph, the execution starting point being used to represent a to-be-processed service to be first executed, the execution end point being used to represent a to-be-processed service to be finally executed, and the execution midpoint being used to represent a to-be-process-service to be executed from the execution starting point to the execution end point,
        setting respectively first execution order information and final execution order information for the execution starting point and the execution end point, and
        for an execution midpoint in the at least one execution midpoint, determining execution order information between the execution midpoint and another execution midpoint according to the first execution order information, the final execution order information and the directed edge; and
    executing the plurality of to-be-processed services according to the execution order information, wherein the execution order information comprises an overall execution order including a serial execution relationship between a part of the plurality of to-be-processed services and a parallel execution relationship between the other part of the plurality of to-be-processed-servicces.

2. The method according to claim 1, wherein the constructing a directed graph with a to-be-processed service in the plurality of to-be-processed services as a point and with a piece of relationship information in the at least one piece of relationship information as a directed edge comprises:
    setting a corresponding service number for the to-be-processed service in the plurality of to-be-processed services, to obtain a plurality of service numbers corresponding to the plurality of to-be-processed services; and
    marking the service numbers in a plan view, and setting at least one directed edge for a corresponding service number according to the piece of relationship information in the at least one piece of relationship information to obtain the directed graph, wherein a to-be-processed service corresponding to a starting point of the directed edge is executed prior to a to-be-processed service corresponding to an end point of the directed edge.

3. The method according to claim 2, wherein the constructing a directed graph with a to-be-processed service in the plurality of to-be-processed services as a point and with a piece of relationship information in the at least one piece of relationship information as a directed edge comprises:
    detecting the directed graph, and giving a warning signal in response to determining an information loop.

4. The method according to claim 1, wherein the determining execution order information between the execution midpoint and another execution midpoint according to the first execution order information, the final execution order information and a directed edge comprises:
  querying a number of accesses to an end point of a directed edge of the execution midpoint, and determining the execution order information between the execution midpoint and the another execution midpoint according to the number of the accesses.

5. The method according to claim 4, wherein the determining the execution order information between the execution midpoint and the another execution midpoint according to the number of the accesses comprises:
  querying at least one upper-level service number of a to-be-processed service corresponding to a starting point of the directed edge corresponding to the number of the accesses;
  querying a finally executed upper-level service number in the at least one upper-level service number according to the first execution order information and the final execution order information; and
  setting the execution order information of the execution midpoint to next execution order information of execution order information of the finally executed upper-level service number.

6. An electronic device, comprising:
  one or more processors; and
  a storage device, for storing one or more computer-executable instructions,
  wherein the one or more computer-executable instructions, when executed by the one or more processors, cause the one or more processors to perform operations, the operations comprising:
  acquiring a plurality of to-be-processed services and at least one piece of relationship information, the relationship information being used to represent an execution order between each of a plurality of pairs of to-be-processed services in the plurality of to-be-processed services;
  constructing a directed graph with a to-be-processed service in the plurality of to-be-processed services as a point and with a piece of relationship information in the at least one piece of relationship information as a directed edge; and
  generating execution order information of the to-be-processed service in the plurality of to-be-processed services according to the directed graph, wherein the generating execution order information of the to-be-processed service in the plurality of to-be-processed service according to the directed graph comprises:
    determining an execution starting point, an execution end point and at least one execution midpoint in the directed graph, the execution starting point being used to represent a to-be-processed service to be first executed, the execution end point being used to represent a to-be-processed service to be finally executed, and the execution midpoint being used to represent a to-be-processed service to be executed from the execution starting point to the execution end point,
    setting respectively first execution order information and final execution order information for the execution starting point and the execution end point, and for an execution midpoint in the at least one execution midpoint, determining execution order information between the execution midpoint and another execution midpoint according to the first execution order information, the final execution order information and the directed edge; and
  executing the plurality of to-be-processed services according to the execution order information, wherein the execution order information comprises an overall execution order including a serial execution relationship between a part of the plurality of to-be-processed services and a parallel execution relationship between the other part of the plurality of to-be-processed-services.

7. The electronic device according to claim 6, wherein the constructing a directed graph with a to-be-processed service in the plurality of to-be-processed services as a point and with a piece of relationship information in the at least one piece of relationship information as a directed edge comprises:
  setting a corresponding service number for the to-be-processed service in the plurality of to-be-processed services, to obtain a plurality of service numbers corresponding to the plurality of to-be-processed services; and
  marking the service numbers in a plan view, and setting at least one directed edge for a corresponding service number according to the piece of relationship information in the at least one piece of relationship information to obtain the directed graph, wherein a to-be-processed service corresponding to a starting point of the directed edge is executed prior to a to-be-processed service corresponding to an end point of the directed edge.

8. The electronic device according to claim 7, wherein the constructing a directed graph with a to-be-processed service in the plurality of to-be-processed services as a point and with a piece of relationship information in the at least one piece of relationship information as a directed edge comprises:
  detecting the directed graph, and giving a warning signal in response to determining an information loop.

9. The electronic device according to claim 6, wherein the determining execution order information between the execution midpoint and another execution midpoint according to the first execution order information, the final execution order information and a directed edge comprises:
  querying a number of accesses to an end point of a directed edge of the execution midpoint, and determining the execution order information between the execution midpoint and the another execution midpoint according to the number of the accesses.

10. The electronic device according to claim 9, wherein the determining the execution order information between the execution midpoint and the another execution midpoint according to the number of the accesses comprises:
  querying at least one upper-level service number of a to-be-processed service corresponding to a starting point of the directed edge corresponding to the number of the accesses;
  querying a finally executed upper-level service number in the at least one upper-level service number according to the first execution order information and the final execution order information; and
  setting the execution order information of the execution midpoint to next execution order information of execution order information of the finally executed upper-level service number.

11. A non-transitory computer readable medium, storing computer-executable instructions thereon, wherein the computer-executable instructions, when executed by a processor, causes the processor to perform operations, the operations comprising:

acquiring a plurality of to-be-processed services and at least one piece of relationship information, the relationship information being used to represent an execution order between each of a plurality of pairs of to-be-processed services in the plurality of to-be-processed services;

constructing a directed graph with a to-be-processed service in the plurality of to-be-processed services as a point and with a piece of relationship information in the at least one piece of relationship information as a directed edge; and generating execution order information of the to-be-processed service in the plurality of to-be-processed services according to the directed graph, wherein the generating execution order information of the to-be-processed service in the plurality of to-be-processed service according to the directed graph comprises:

determining an execution starting point, an execution end point and at least one execution midpoint in the directed graph, the execution starting point being used to represent a to-be-processed service to be first executed, the execution end point being used to represent a to-be-processed service to be finally executed, and the execution midpoint being used to represent a to-be-processed service to be executed from the execution starting point to the execution end point, setting respectively first execution order information and final execution order information for the execution starting point and the execution end point, and for an execution midpoint in the at least one execution midpoint determining execution order information between the execution midpoint and another execution midpoint according to the first execution order information, the final execution order information and the directed edge; and executing the plurality of to-be-processed services according to the execution order information, wherein the execution order information comprises an overall execution order including a serial execution relationship between a part of the plurality of to-be-processed services and a parallel execution relationship between the other part of the plurality of to-be-processed-services.

\* \* \* \* \*